United States Patent
Maron et al.

(10) Patent No.: US 10,830,623 B2
(45) Date of Patent: Nov. 10, 2020

(54) SENSOR DETECTION OF THE PRESENCE OF AN AIR CORE IN A FLUID CONDUCTOR, AND THE FLOW RATE OF THE FLUID IN THE CONDUCTOR

(71) Applicant: CiDRA Corporate Services Inc., Wallingford, CT (US)

(72) Inventors: Robert J. Maron, Middletown, CT (US); Juan F. Medina, West Jordan, UT (US); Dylan Cirulis, Salt Lake City, UT (US); Joseph Mercuri, Wallingford, CT (US)

(73) Assignee: CIDRA CORPORATE SERVICES, INC., Wallingford, CT (US)

( * ) Notice: Subject to any disclaimer, the term of this patent is extended or adjusted under 35 U.S.C. 154(b) by 380 days.

(21) Appl. No.: 15/541,839

(22) PCT Filed: Feb. 5, 2016

(86) PCT No.: PCT/US2016/016721
§ 371 (c)(1),
(2) Date: Jul. 6, 2017

(87) PCT Pub. No.: WO2016/127030
PCT Pub. Date: Aug. 11, 2016

(65) Prior Publication Data
US 2018/0010945 A1 Jan. 11, 2018

Related U.S. Application Data
(60) Provisional application No. 62/112,433, filed on Feb. 5, 2015.

(51) Int. Cl.
*G01F 1/20* (2006.01)
*G01F 5/00* (2006.01)
(Continued)

(52) U.S. Cl.
CPC .............. *G01F 1/86* (2013.01); *B03D 1/028* (2013.01); *B04C 11/00* (2013.01); *G01F 1/20* (2013.01);
(Continued)

(58) Field of Classification Search
CPC ............ G01F 1/86; G01F 1/74; G01F 1/7082; G01N 29/036; G01N 15/10; G01N 15/02; B03D 1/028
See application file for complete search history.

(56) References Cited

U.S. PATENT DOCUMENTS 3,353,673 A   11/1967  Visman
5,560,818 A * 10/1996  Sharrow .............. B03D 1/1425
                                                    162/4
(Continued)

FOREIGN PATENT DOCUMENTS

CN         202606310 U    12/2012

OTHER PUBLICATIONS

Neesse et al., "Measuring the operating state of the hydrocyclone" Minerals Engineering 17 (2004) 697-703 (Year: 2004).*
(Continued)

*Primary Examiner* — Stephanie E Bloss
(74) *Attorney, Agent, or Firm* — Ware, Fressola, Maguire & Barber LLP (57) ABSTRACT

Apparatus features a signal processor or signal processing module configured to: receive signaling containing information about a central air-core of an overflow pipe of a hydrocyclone where fluid flow is concentrated in an outer annular region of the overflow pipe that is against an inner wall of the overflow pipe during a normal operation of the hydrocyclone; and determine corresponding signaling containing information about a collapse of the central air-core of the overflow pipe of the hydrocyclone during an abnormal
(Continued)

operation of the hydrocyclone, based upon the signaling received. The signaling contains information about a fluid flow rate of the fluid flow by detecting a change in the magnitude of a force and/or a moment on the probe.

28 Claims, 6 Drawing Sheets

(51) Int. Cl.

| | | |
|---|---|---|
| *G01N 15/02* | (2006.01) | |
| *G01N 15/10* | (2006.01) | |
| *G01F 1/86* | (2006.01) | |
| *G01F 23/18* | (2006.01) | |
| *G01F 1/708* | (2006.01) | |
| *G01M 3/26* | (2006.01) | |
| *B04C 11/00* | (2006.01) | |
| *G01F 1/28* | (2006.01) | |
| *G01F 1/74* | (2006.01) | |
| *G01N 29/036* | (2006.01) | |
| *B03D 1/02* | (2006.01) | |
| *B03D 1/002* | (2006.01) | |

(52) U.S. Cl.
CPC .............. *G01F 1/28* (2013.01); *G01F 1/7082* (2013.01); *G01F 1/74* (2013.01); *G01F 5/00* (2013.01); *G01F 23/18* (2013.01); *G01M 3/26* (2013.01); *G01N 15/02* (2013.01); *G01N 15/10* (2013.01); *G01N 29/036* (2013.01)

(56) References Cited

U.S. PATENT DOCUMENTS

| | | | |
|---|---|---|---|
| 2012/0209550 A1* | 8/2012 | Van Der Spek | G01N 15/10 702/63 |
| 2013/0220938 A1* | 8/2013 | Castro | B01D 21/267 210/741 |
| 2014/0151274 A1* | 6/2014 | Hadfield | B04C 11/00 210/85 |

OTHER PUBLICATIONS

Hou et al., "Acoustic monitoring of hydrocyclones" Powder Technology 124 (2002) 176-187 (Year: 2002).*
English Language Abstract of CN202606310U.

* cited by examiner

FIGURE 1A: Mineral Extraction Processing System - Prior Art

FIGURE 1B: - Prior Art

FIGURE 2: Classification Stage - Prior Art

FIGURE 3 - Prior Art

Apparatus 100

Signal processor or processing module 102 configured at least to:

receive signaling $S_{in}$ containing information about a central air-core of an overflow pipe of a hydrocyclone where fluid flow is concentrated in an outer annular region of the overflow pipe that is against an inner wall of the overflow pipe during a normal operation of the hydrocyclone; and determine corresponding signaling containing information about a collapse of the central air-core of the overflow pipe of the hydrocyclone during an abnormal operation of the hydrocyclone, based upon the signaling received; and/or provide the corresponding signaling $S_{out}$, including where the corresponding signaling $S_{out}$ contains information about the collapse of the central air-core of the overflow pipe of the hydrocyclone during the abnormal operation of the hydrocyclone.

$S_{in}$ | Other signal processor circuits or components 104 that do not form part of the underlying invention, e.g., including input/output modules, one or more memory modules, data, address and control busing architecture, etc. | $S_{out}$ Figure 4: The Basic Apparatus Figure 5A: RCA/Audio Plug 3.5mm (Prior art)

Figure 5: Example of probe installed in an overflow pipe for detecting the presence of an air core.

110

110a, Receive signaling $S_{in}$ containing information about a central air-core of an overflow pipe of a hydrocyclone where fluid flow is concentrated in an outer annular region of the overflow pipe that is against an inner wall of the overflow pipe during a normal operation of the hydrocyclone 110b, Determine corresponding containing information about a collapse of the central air-core of the overflow pipe of the hydrocyclone during an abnormal operation of the hydrocyclone, based upon the signaling received 110c, Provide corresponding signaling $S_{out}$, including where the corresponding signaling $S_{out}$ contains information about the collapse of the central air-core of the overflow pipe of the hydrocyclone during the abnormal operation of the hydrocyclone

Figure 6

SENSOR DETECTION OF THE PRESENCE OF AN AIR CORE IN A FLUID CONDUCTOR, AND THE FLOW RATE OF THE FLUID IN THE CONDUCTOR

CROSS-REFERENCE TO RELATED APPLICATIONS

This application claims benefit to provisional patent application Ser. No. 62/112,433, filed 5 Feb. 2015; which is incorporated by reference in its entirety.

This application is related to PCT patent application Ser. No. PCT/US16/15334, filed 28 Jan. 2016, which claims benefit to provisional patent application Ser. No. 62/108,689, filed 28 Jan. 2015; which are both incorporated by reference in its entirety.

This application is related to PCT patent application Ser. No. PCT/US14/52628, filed 26 Aug. 2014, which claims benefit to provisional patent application Ser. No. 61/869,901, filed 26 Aug. 2013, which are both incorporated by reference in their entirety.

This application is related to patent application Ser. No. 13/389,546, which corresponds to PCT/US10/45178, filed 11 Aug. 2010, claiming benefit to provisional patent application Ser. No. 61/232,875, filed 11 Aug. 2009; Ser. No. 61/400,819, filed 2 Aug. 2010; and Ser. No. 61/370,154, filed 3 Aug. 2010, which are all incorporated by reference in their entirety.

This application is also related to patent application Ser. No. 13/377,083, which corresponds to PCT/US10/38281, filed 11 Jun. 2010, claiming benefit to provisional patent application Ser. No. 61/186,502, 12 Jun. 2009, which are all incorporated by reference in their entirety.

This application is related to patent application Ser. No. 12/991,636, which corresponds to PCT/US09/43438, filed 11 May 2009, claiming benefit to provisional patent application Ser. Nos. 61/051,775, 61/051,781, and 61/051,803, all filed 9 May 2008, which are all incorporated by reference in their entirety.

The aforementioned applications were all assigned to the assignee of the present application, which builds on this family of technology.

BACKGROUND OF THE INVENTION

1. Field of Invention

This invention relates to a technique for optimizing the performance of cyclones, e.g., operating in a hydrocyclone battery in a mineral extraction processing system, including extracting a mineral from ore.

2. Description of Related Art

General Background

Figure 1A:
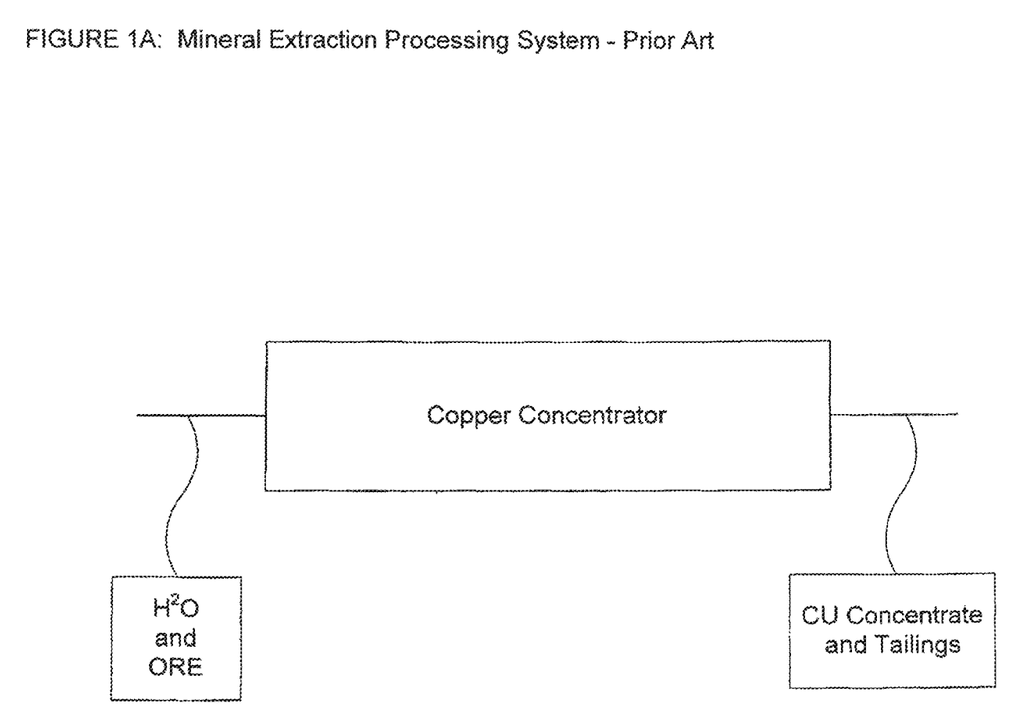
FIG. 1A is a block diagram of a mineral extraction processing system in the form of a copper concentrator that is known in the art.
Figure 1B:
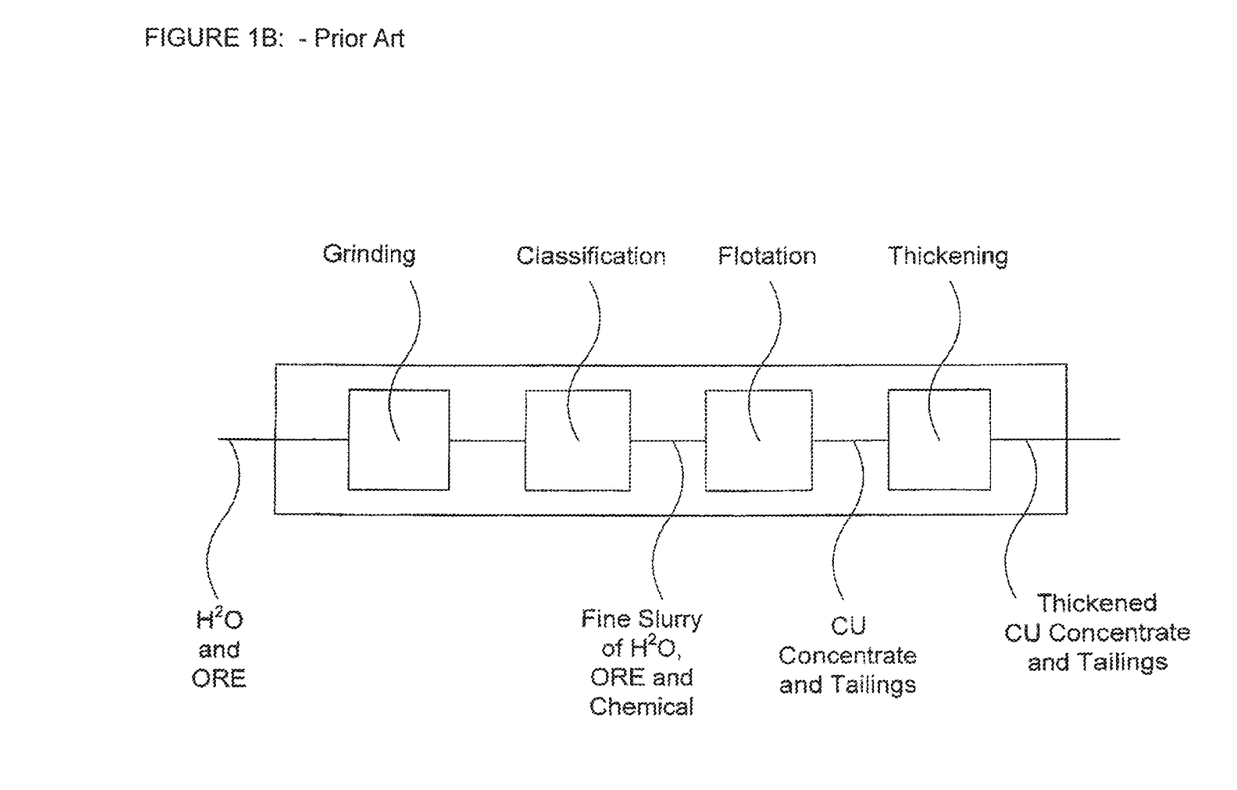
FIG. 1B is a block diagram showing typical processing stages of a mineral extraction processing system that is known in the art.

In many industrial processes the sorting, or classification, of product by size is critical to overall process performance. A minerals processing plant, or beneficiation plant, is no exception. In the case of a copper concentrator as shown in FIG. 1A, the input to the plant is water and ore (of a particular type and size distribution) and the outputs are copper concentrate and tailings. The process consists of a grinding, classification, floatation, and thickening, as shown in FIG. 1B. The grinding and classification stage produces a fine slurry of water and ore, to which chemicals are added prior to being sent to the flotation stage. Once in the flotation stage, air is used to float the copper mineral while the gangue (tailings) is depressed. The recovered copper is cleaned and dried. The tailings are thickened and sent to the tailings pond. The classification stage is critical to the performance of two areas of the process. These areas are the grinding throughput and flotation recovery, grade and throughput.

A grinding operation may include a screens and crusher stage and a mill stage, that is typically configured mills in closed circuit with a hydrocyclone battery. A hydrocyclone is a mechanical device that will separate a slurry stream whereby the smaller particles will exit out the overflow line and the larger particles will exit out the underflow line. The overflow is sent to the flotation circuit and the underflow is sent back to the mill for further grinding. A collection of these devices is called a battery. A hydrocyclone will be sized based on the particular process requirements. The performance of the hydrocyclone is dependent on how well it is matched to the process conditions. Once the proper hydrocyclone has been chosen and installed, it must be operated within a specific range in order to maintain the proper split between the overflow and the underflow. The split is dependent on slurry feed density and volumetric flow into the device. A typical control system will use a combination of volumetric flow, feed density and pressure across the hydrocyclone to control the split. Because of the harsh environmental and process conditions all of these measurements suffer from maintenance and performance issues. This can result in reduced classification performance and reduced mill throughput. Flotation performance is highly dependent on the particle size distribution in the feed which comes from the battery overflow, thus it is dependent on the hydrocyclone classification performance. The mill throughput is highly dependent on the circulation load which comes from the battery underflow. Traditionally hydrocyclone performance has been determined by evaluating manually collected samples from the consolidated hydrocyclone battery overflow stream. This technique is time consuming; the accuracy is subject to sampling techniques; the sample is a summation of all the hydrocyclones from the battery; and has a typical 24 hour turnaround time. Therefore it is not possible to implement a real time control algorithm to monitor, control, and optimize the each individual hydrocyclone.

Real time monitoring of each individual hydrocyclone would provide the ability to track the performance of individual hydrocyclones. This would enable the following:
- The detection of hydrocyclones that require maintenance or have become plugged.
- The detection of operational performance instabilities that cause extended periods of roping or surging.
- The detection of chronic problems with certain hydrocyclones.
- Tighter classification control with changing throughput demands and feed densities.
- Increased up time or availability of the hydrocyclone battery.

Figure 2:
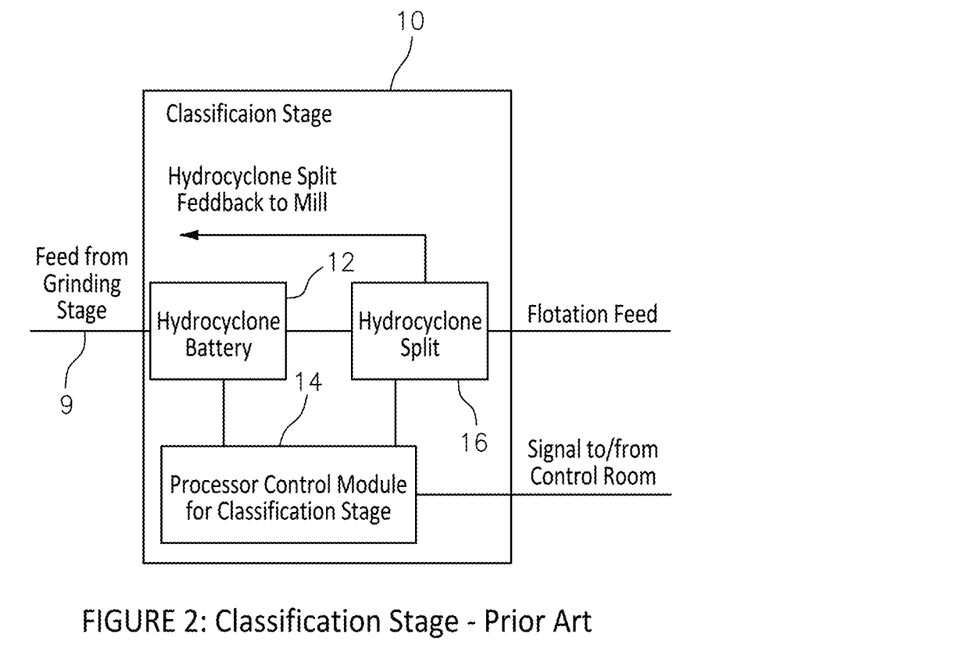
FIG. 2 is a block diagram showing a classification stage that is known in the art.

Moreover, FIG. 2 shows a classification stage generally indicated as 10 that may form part of a mineral extraction processing system, like the one shown in FIGS. 1A and 1B for extracting minerals from ore. The classification stage 10 includes a hydrocyclone battery 12 that receives a feed from a grinding stage, as shown in FIG. 1B. The hydrocyclone battery 12 is configured to respond to signaling from a signal processor or processor control module 14, and provide an effluent, e.g., a fine slurry or slurry feed, to a flotation stage shown in FIG. 1B. The classification stage 10 also may include a hydrocyclone split 16 that receives the slurry from the hydrocyclone battery 12, and also may receive signaling from the signal processor or processor control module 14, and may provide some portion of the slurry back to the mill stage shown in FIG. 1B, and may also provide another portion of the slurry as a flotation feed to a flotation stage shown in FIG. 1B. The signal processor or processor control module 14 may also send to or receive from one or more signals along line 14a with a control room computer 50 (see FIG. 3A). The technique to track the flow performance of individual cyclones operating in parallel on a single battery is described in relation to the hydrocyclone battery 12 (i.e. the single battery), the signal processor or processor control module 14 and the cooperation of these two components.

Figure 3:
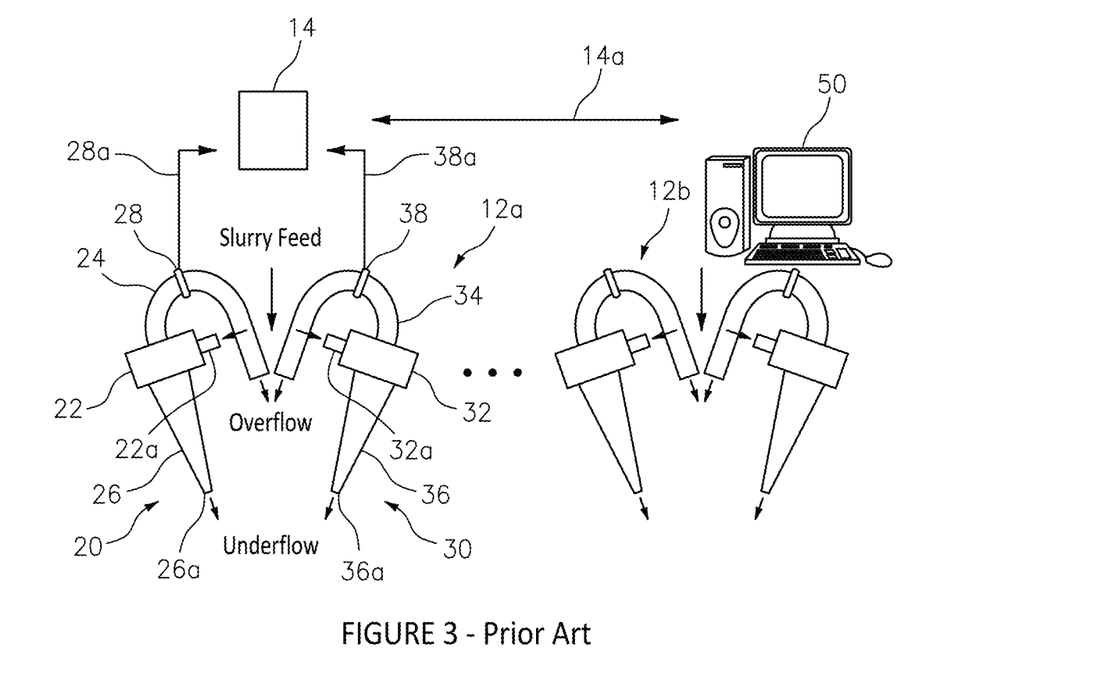
FIG. 3 is a diagram showing a cyclone battery, sensors, a signal processor and a remote computer processor that is known in the art.

FIG. 3 shows the hydrocyclone battery 12 (i.e. the single battery), the signal processor or processor control module 14 and the cooperation of these two components according to some embodiments of the present invention. For example, the hydrocyclone battery 12 may include a first and second hydrocyclone pair 12a, 12b. The first hydrocyclone pair 12a includes a first hydrocyclone 20 and a second hydrocyclone 30. The first hydrocyclone 20 has a cylindrical section 22 with an inlet portion 22a for receiving via a feed pipe 9 the feed from the grinding stage shown in FIG. 1B, an overflow pipe 24 for providing one portion of the fine slurry or slurry feed to either the flotation stage shown in FIG. 1B, or the hydrocyclone split 16 shown in FIG. 2, and has a conical base section 26 with underflow outlet 26a for providing a remaining portion of the fine slurry or slurry feed.

Similarly, the second hydrocyclone 30 has a cylindrical section 32 with an inlet portion 32a for receiving the feed from the grinding stage shown in FIG. 1B, an overflow pipe 34 for providing one portion of the fine slurry or slurry feed to either the flotation stage shown in FIG. 1B, or the hydrocyclone split 16 shown in FIG. 2, and has a conical base section 36 with underflow outlet 36a for providing a remaining portion of the fine slurry or slurry feed.

As one skilled in the art would appreciate, the first and second hydrocyclones 20, 30 classify, separate and sort particles in the feed from the grinding stage based at least partly on a ratio of their centripetal force to fluid resistance. This ratio is high for dense and course particles, and low for light and fine particles. The inlet portion 22a, 32a receives tangentially the feed from the grinding stage shown in FIG. 1B, and the angle and the length of the conical base section 26, 36 play a role in determining its operational characteristics, as one skilled in the art would also appreciate.

In the example shown in FIG. 3, at least one sensor 28 may be surface mounted on the overflow pipe 24 that is configured to respond to sound propagating in the overflow pipe 24 of the cyclone 20, and to provide at least one signal containing information about sound propagating through the slurry flowing in the overflow pipe 24 of the cyclone 20. Similarly, at least one corresponding sensor 38 is surface mounted on the overflow pipe 34 that is configured to respond to sound propagating in the overflow pipe 34 of the cyclone 30, and to provide at least one corresponding signal containing information about sound propagating through the slurry flowing in the overflow pipe 34 of the cyclone 30. By way of example, the at least one sensors 28, 38 may take the form of a SONAR-based clamp-around surface-mounted flow meter, which is known in the art consistent with that described below. The SONAR-based clamp-around flow meters 28, 38 may be clamped in whole or in part around some portion of the overflow pipes 24, 34. For example, the at least one sensor or meter 28, 38 may be surface mounted on the top of the overflow pipes 24, 34, or the at least one sensor or meter 28, 38 may be surface mounted on the bottom of the overflow pipe 24, 34. Alternatively, a pair of at least one sensor or meter 28, 38 may be surface mounted on the overflow pipes 24, 34, e.g., with one sensor or meter mounted on the top surface of the overflow pipes 24, 34, and with another sensor or meter mounted on the bottom surface of the overflow pipe 24, 34.

By way of example, in operation the SONAR-based clamp-around flow meters 28, 38 may be configured to respond to a strain imparted by the slurry, e.g., made up of water and fine particles, flowing in the overflow pipes 24, 34 of the cyclones 20, 30, and provide the signals along signal paths or lines 28a, 38a containing information about sound propagating through the slurry flowing in the overflow pipes 24, 34 of the cyclones 20, 30.

The Problem Addressed by the Present Application

By way of example, consistent with that set forth above, the assignee of the instant application has developed a wetted probe known in the industry as CYCLONEtrac™ that may be inserted radially into the overflow pipe of a hydrocyclone and measures the characteristic particle size of the fluid stream that passes over the probe. The probe detects the acoustic signal produced by impacts of particles against the probe. Different size particles produce a different acoustic signature which can be used to determine the characteristic particle size. The probe is in the shape of an elongated cylinder but other shapes can be used.

During normal operation of the hydrocyclone, there is a central air-core in the hydrocyclone and the overflow pipe and the fluid flow is concentrated in an outer annular region of the pipe that is against the pipe inner wall. In this normal operating condition, the hydrocyclone is classifying particles according to size and thus large particles are discharging though the underflow pipe and small particles are discharging through the overflow pipe.

During abnormal operation, the central air-core collapses and the fluid fills most or all of the pipe's cross sectional area. In this abnormal condition, the hydrocyclone is no longer classifying particles and thus both small and the undesired large particles are discharging through the overflow pipe. This condition is undesirable because the large particles contain valuable mineral that has not been sufficiently ground and liberated and thus cannot be recovered in the downstream process such as flotation and is permanently lost. Also the volume of flow through the overflow pipe greatly increases during this condition since much less flow is discharging through the underflow pipe.

Detecting this abnormal condition has value because operators can take corrective actions such as closing or 'resetting' the cyclone by stopping and restarting the feed flow.

In view of this, there is a need in the industry for a better way for determining a collapse of a central air-core of an overflow pipe in a hydrocyclone cyclone, e.g., so as to allow an operator to take corrective actions such as closing or 'resetting' the cyclone by stopping and restarting the feed flow.

SUMMARY OF THE INVENTION

The Present Invention

The present invention provides new and unique techniques for the detection of the collapse of the central air-core, which can be accomplished in the following ways.

Since the volume of fluid flow of fluid through the pipe increases greatly when the central air-core collapses, the forces on the probe/sensor will also greatly increase. The probe/sensor can detect this increase in force by various means that are well known.

One technique is to use strain gauges to detect the bending moment on the probe/sensor produced by the fluid impact.

Another example is using an acoustic probe/sensor to look at the frequency spectrum that will be significantly different depending on the presence or absence of the central air-core.

An additional technique is to use a probe/sensor with one or more separate detection areas located along the axis of the probe. These one or more separate detection areas will experience significantly different acoustic signals depending on the presence or absence of the central air core, i.e. whether or not there is fluid or slurry impacting these separate detection areas. These one or more separate detection areas can be formed by creating acoustically isolated cylindrical areas along the cylindrical axis of the probe/sensor by using an acoustically isolating material such as rubber between metallic detection areas. Both the metal and isolating material should have very good abrasion resistance so they can survive the flow of abrasive particles in the fluid. The one or more separate detection areas may be coupled to individual transducers, e.g., via separate wave guides that are designed into the probe/sensor. Such wave guides could be concentric cylinders with acoustic isolation between them. By way of example, and as an alternative to the aforementioned wetted probe, the general design of such a probe/sensor could resemble, or take the basic form of, a typical audio plug like that shown in FIG. 1 herein that may be adapted to implement the functionality consistent with that set forth herein.

Moreover, detection of a fluid flow rate may also be accomplished by detecting the change in the magnitude of the force and/or moment on the probe/sensor, e.g., consistent with that set forth herein. Detection of a decrease in fluid force can be useful because as the underflow discharge (apex) of the hydrocyclone wears, the amount of fluid flow through the apex increases and the fluid flow through the overflow decreases, assuming the fluid input pressure is the same. Thus detection of lower fluid flow through the overflow could indicate wear of the apex.

By way of example, the aforementioned wetted probe/sensor developed by the assignee of the instant application has the ability, and may be adapted, to detect the collapse of the central air-core, consistent with that set forth herein.

Particular Embodiments

In its broadest sense, the new and unique techniques, e.g., may include, or take the form of, a method and/or an apparatus, to detect a collapse of the central air-core of the overflow pipe of the hydrocyclone during an abnormal operation of the hydrocyclone.

According to some embodiments of the present invention, the apparatus may comprise at least one signal processor or signal processing module configured at least to:
  receive signaling containing information about a central air-core of an overflow pipe of a hydrocyclone where fluid flow is concentrated in an outer annular region of the overflow pipe that is against an inner wall of the overflow pipe during a normal operation of the hydrocyclone; and
  determine corresponding signaling containing information about a collapse of the central air-core of the overflow pipe of the hydrocyclone during an abnormal operation of the hydrocyclone, based upon the signaling received.

The apparatus may include one or more of the following additional features:

The signal processor or processing module may be configured to provide the corresponding signaling, including where the corresponding signaling contains information about the collapse of the central air-core of the overflow pipe of the hydrocyclone during the abnormal operation of the hydrocyclone.

The signaling may be received from a probe inserted radially in the overflow pipe of the hydrocyclone in contact with the fluid flow, including where the apparatus includes comprises the probe.

The apparatus may include the hydrocyclone having the overflow pipe with the probe inserted radially therein so as to contact the fluid flow and central air-core.

By way of one example, the signaling may contain information about measurements by strain gauges that detect a bending moment on the probe produced by the fluid flow impact.

By way of another example, the signaling may contain information about an acoustic frequency spectrum that will be significantly different depending on the presence or absence of the central air-core. The probe may include, or takes the form of, an acoustic sensor that responds to the fluid flow and provides the signaling containing information about the acoustic frequency spectrum.

By way of still another example, the signaling may contain information about one or more separate detection areas located along an axis of the probe that experience significantly different acoustic signals depending on the presence or absence of the central air core, including whether or not there is fluid or slurry impacting the one or more separate detection areas. The one or more separate detection areas may be formed by creating acoustically isolated cylindrical areas along a cylindrical axis of the probe by using an acoustically isolating material, including rubber between metallic detection areas. The one or more separate detection areas may include both metal material and isolating material. The one or more separate detection areas may be coupled to individual transducers via separate wave guides that are configured or designed into the probe. The separate wave guides may be concentric cylinders with acoustic isolation arranged in between.

The signal processor or signal processing module may be configured to determine a fluid flow rate of the fluid flow by detecting a change in the magnitude of a force and/or a moment on the probe; and also be configured to provide corresponding signaling that contains information about the fluid flow rate determined.

According to some other embodiments, the present invention may take the form of a method featuring steps for receiving in a signal processor or signal processing module signaling containing information about a central air-core of an overflow pipe of a hydrocyclone where fluid flow is concentrated in an outer annular region of the overflow pipe that is against an inner wall of the overflow pipe during a normal operation of the hydrocyclone; and determining in the signal processor or signal processing module corresponding signaling containing information about a collapse of the central air-core of the overflow pipe of the hydrocyclone during an abnormal operation of the hydrocyclone, based upon the signaling received.

The signal processor or signal processor module may take the form of a signal processor and at least one memory including a computer program code, where the signal processor and at least one memory are configured to cause the apparatus to implement the functionality of the present invention, e.g., to respond to signaling received and to determine the corresponding signaling, based upon the signaling received.

According to some embodiment, the present invention may take the form of apparatus comprising means for receiving signaling containing information about a central air-core of an overflow pipe of a hydrocyclone where fluid flow is concentrated in an outer annular region of the overflow pipe that is against an inner wall of the overflow pipe during a normal operation of the hydrocyclone; and means for determining corresponding signaling containing information about a collapse of the central air-core of the overflow pipe of the hydrocyclone during an abnormal operation of the hydrocyclone, based upon the signaling received, consistent with that set forth herein.

According to some embodiments of the present invention, the apparatus may also take the form of a computer-readable storage medium having computer-executable components for performing the steps of the aforementioned method.

The computer-readable storage medium may also include one or more of the features set forth above.

One advantage of the present invention is that it provides a better way for determining a collapse of a central air-core of an overflow pipe in a hydrocyclone cyclone, e.g., so as to allow an operator to take corrective actions such as closing or 'resetting' the cyclone by stopping and restarting the feed flow.

BRIEF DESCRIPTION OF THE DRAWING

The drawing includes FIGS. 1A-6, which are not necessarily drawn to scale, as follows:

FIG. 5 includes FIGS. 5A, 5B and 5C, where

DETAILED DESCRIPTION OF BEST MODE OF THE INVENTION

Summary of Basic Invention

In general, the present invention provides new and unique techniques for

The present invention provides new and unique techniques for the detection of the collapse of the central air-core, which can be accomplished in the following ways.

Since the volume of fluid flow of fluid through the pipe increases greatly when the central air-core collapses, the forces on the probe/sensor will also greatly increase. The probe/sensor can detect this increase in force by various means that are well known.

One technique is to use strain gauges to detect the bending moment on the probe/sensor produced by the fluid impact.

Another example is using an acoustic probe/sensor to look at the frequency spectrum that will be significantly different depending on the presence or absence of the central air-core.

Figure 5A:
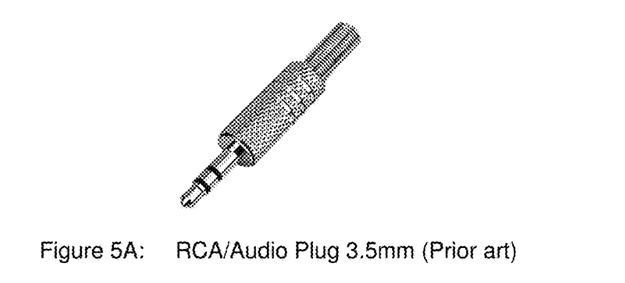
FIG. 5A shows an RCA/Audio plug 3.5 mm, which may be adapted to implement one or more embodiments according to the present invention; where

An additional technique is to use a probe/sensor with one or more separate detection areas located along the axis of the probe. These one or more separate detection areas will experience significantly different acoustic signals depending on the presence or absence of the central air core, i.e. whether or not there is fluid or slurry impacting these separate detection areas. These one or more separate detection areas can be formed by creating acoustically isolated cylindrical areas along the cylindrical axis of the probe/sensor by using an acoustically isolating material such as rubber between metallic detection areas. Both the metal and isolating material should have very good abrasion resistance so they can survive the flow of abrasive particles in the fluid. The one or more separate detection areas may be coupled to individual transducers, e.g., via separate wave guides that are designed into the probe/sensor. Such wave guides could be concentric cylinders with acoustic isolation between them. By way of example, and as an alternative to the aforementioned wetted probe, the general design of such a probe/sensor could resemble, or take the basic form of, a typical audio plug like that shown in FIG. 5A herein that may be adapted to implement the functionality consistent with that set forth herein.

Examples are disclosed herein of such a probe/sensor installed in such an overflow pipe, and configured for detecting the presence of the central air core.

Figure 4:
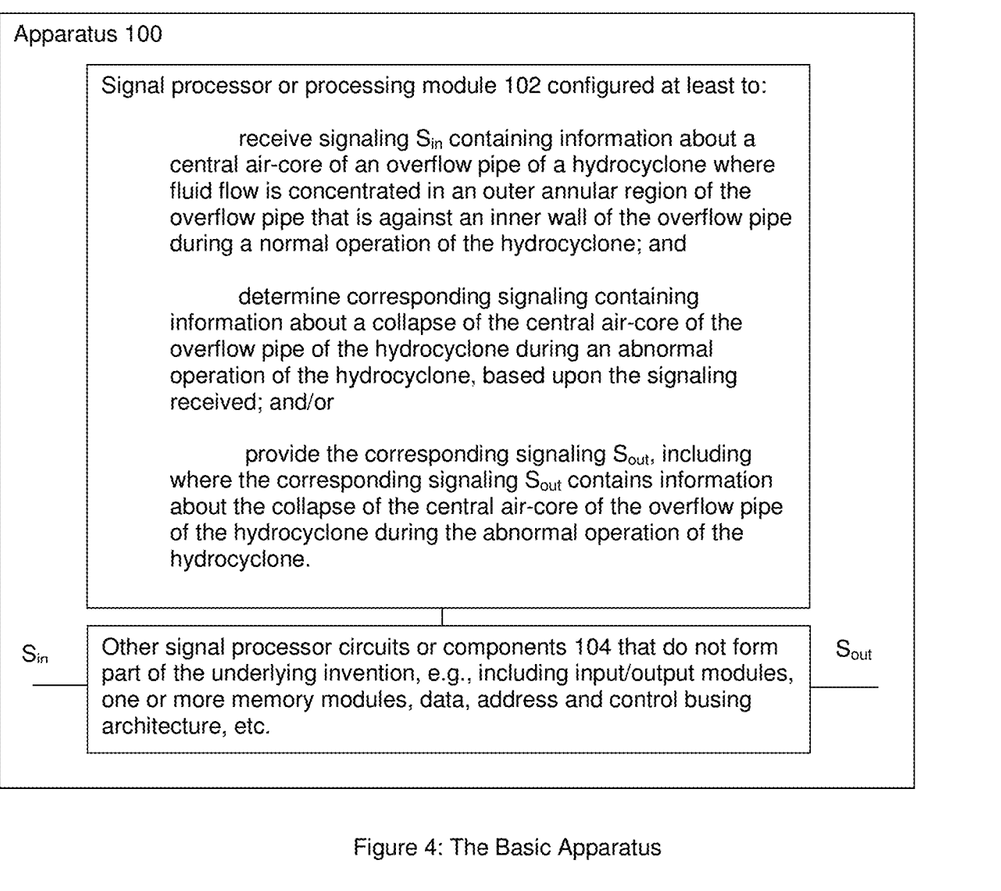
FIG. 4 shows a block diagram of apparatus, e.g., having a signal processor or signal processing module for implementing signal processing functionality, according to some embodiments of the present invention.

FIG. 4

By way of example, FIG. 4 shows apparatus generally indicated as 100, e.g. having at least one signal processor or signal processing module 102 for implementing the signal processing functionality according to the present invention. In operation, the at least one signal processor or signal processing module 102 may be configured at least to:

receive signaling $S_{in}$ containing information about a central air-core of an overflow pipe of a hydrocyclone where fluid flow is concentrated in an outer annular region of the overflow pipe that is against an inner wall of the overflow pipe during a normal operation of the hydrocyclone; and determine corresponding signaling $S_{out}$ containing information about a collapse of the central air-core of the overflow pipe of the hydrocyclone during an abnormal operation of the hydrocyclone, based upon the signaling received.

By way of example, the signaling $S_{in}$ may be received from a CYCLONEtrac™ PST probe that may be mounted on the overflow pipe of the hydrocyclone. (See FIG. 5C that show photos of the probe arranged in the overflow pipe of the hydrocyclone.)

The at least one signal processor or signal processing module 102 may also be configured to determine the corresponding signaling containing information about the collapse of the central air-core of the overflow pipe of the hydrocyclone during an abnormal operation of the hydrocyclone, based upon the signaling received. For example, a person skilled in the art would appreciate and understanding without undue experimentation, especially after reading the instant patent application together with that known in the art, e.g., how to implement suitable signaling processing functionality to make one or more such determinations.

The at least one signal processor or signal processing module 102 may be configured to provide the corresponding signaling $S_{out}$. By way of example, the corresponding signaling $S_{out}$ provided may include, take the form of, or contain information about the collapse of the central air-core of the overflow pipe of the hydrocyclone during an abnormal operation of the hydrocyclone.

According to some embodiments of the present invention, the apparatus 100 may also include, e.g., one or more probes, a hydrocyclone, the battery of hydrocyclones, etc., e.g., consistent with that set forth herein.

FIG. 5

Figures 5B, 5C:
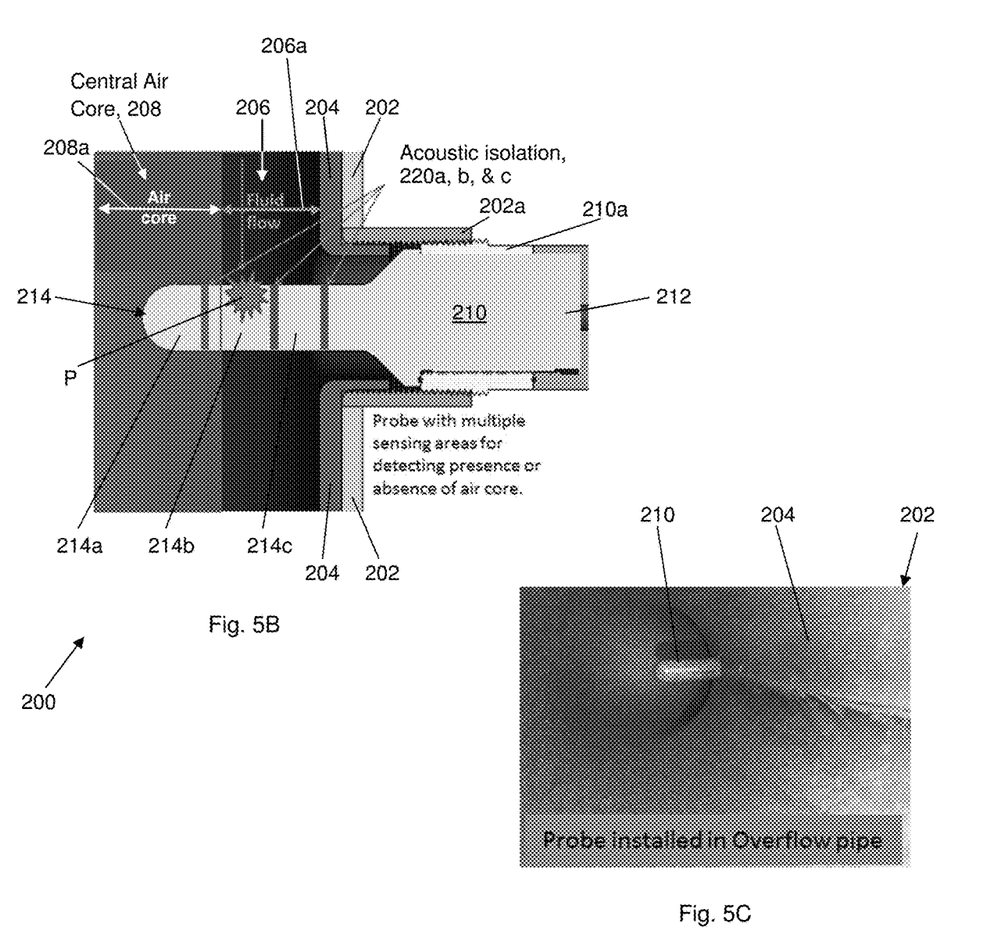
FIG. 5B is a diagram showing a partial cross-section of an overflow pipe that forms part of a hydrocyclone having a probe arranged therein, according to some embodiments of the present invention; and where
FIG. 5C shows a photograph of a probe like that shown in FIG. 5B installed in the overflow pipe, according to some embodiments of the present invention.

By way of example, FIG. 5B shows a combination generally indicated as 200 that include parts 202, 204 of an overflow pipe that forms part of a hydrocyclone (see FIG. 3) having a probe 210 arranged therein, according to some embodiments of the present invention. The part 202 is an outer wall of the overflow pipe, and the part 204 is an inner wall of the overflow pipe. The overflow pipe has fluid flowing 206 therein along the inner wall 204, and also has a central air core 208 at some instant in time. FIG. 5B includes arrows 206a, 208a indicating the expanse of the fluid flow 206 and the central air core 208 within the overflow pipe. The fluid flow 206 may take the form of a slurry being processed by the overflow pipe that includes particles that will strike and cause an impact on the probe 210, one of such particles is generally indicated by reference label P.

By way of example, the outer wall 202 may include an outer wall fastening portion 202a having threads, and the probe 210 may include a corresponding outer wall fastening portion 210a having corresponding threads. In FIG. 5B, the probe 210 is shown fastened to the outer wall 202 by screwing the corresponding threads of corresponding outer wall fastening portion 210a into the threads of the outer wall fastening portion 202a. The scope of the invention is not intended to be limited to any particular fastening technique, and embodiments are envisioned using other types or kinds of fastening techniques either now known or later developed in the future.

By way of further example, the probe 210 is configured with a base portion 212 and a probe portion 214. The base portion 212 is fastened to the outer wall 202 of the overflow pipe, e.g., consistent with that set forth above. The probe portion 214 may be configured with acoustic isolation members 220a, 220b, 220c for acoustically isolating probe subportions 214a, 214b, 214c, which provide the probe 210 with multiple sensing areas for detecting the presence or absence of the central air core 208 as well as the fluid flowing 206.

FIG. 5C shows a photograph of a probe like element 210 shown in FIG. 5B installed in such an overflow pipe indicated by reference label 202 having an inner wall like indicated by reference label 204.

By way of example, in operation since the volume of fluid flow 206 of fluid through the overflow pipe increases greatly when the central air-core 208 collapses, the forces on the probe/sensor 210 will also greatly increase. The probe/sensor 210 can detect this increase in force by using various signal processing means or techniques, e.g., consistent with that known in the art and set forth below.

For instance, FIG. 5B shows that the fluid flow 206 extends between the acoustic isolation member 220a, 220b so as to touch at least part of subportion 214b as indicated by the fluid flow arrow 206a; and that the central air-core 208 extends so as to touch at least part of subportion 214b between the acoustic isolation members 220a and 220b as indicated by the central air-core arrow 208a. Consistent with that shown in FIG. 5B, when the central air-core 208 extends with the expanse indicated by the central air-core arrow 208a, then no particles like particle P can strike or impact the probe subportion 214a, particles can strike or impact at least some part of the probe subportion 214b, and particles can strike or impact all of the probe subportion 214c. The acoustic signaling provided from the probe 210 will contain information, e.g., such as an acoustic signature, indicating such particle impacts and absence of the same.

In contrast, and consistent with that shown in FIG. 5B, if the fluid flow 206 extends beyond the acoustic isolation member 220a so as to touch at least part of subportion 214a; and the central air-core 208 extends so as to touch at least part of subportion 214a, then particles like particle P can strike or impact at least part of the probe subportion 214a, particles can strike or impact all of the probe subportion 214b, and particles can strike or impact all of the probe subportion 214c. The acoustic signaling provided from the probe 210 will contain corresponding information, e.g., such as a corresponding acoustic signature, indicating such corresponding particle impacts and absence of the same.

In further contrast, and consistent with that shown in FIG. 5B, if the fluid flow 206 extends beyond the acoustic isolation member 220c so as to touch at least part of subportion 214c; and the central air-core 208 extends so as to touch at least part of subportion 214c, then no particles like particle P can strike or impact the probe subportion 214a, no particles can strike or impact the probe subportion 214b, and particles can strike or impact at least part of the probe subportion 214c. The acoustic signaling provided from the probe 210 will contain further corresponding information, e.g., such as a further corresponding acoustic signature, indicating such further corresponding particle impacts and absence of the same.

In still further contrast, and consistent with that shown in FIG. 5B, if the fluid flow 206 extends beyond and fully immerses the subportion 214a; and the central air-core 208 extends so as not to touch at least part of subportion 214a, then particles like particle P can strike or impact all of the probe subportion 214a, particles can strike or impact all of the probe subportion 214b, and particles can strike or impact all of the probe subportion 214c. The acoustic signaling provided from the probe 210 will contain still further corresponding information, e.g., such as a still further corresponding acoustic signature, indicating such still further corresponding particle impacts and absence of the same. This still further corresponding acoustic signature may be an indication of the collapse of the central air-core. For example, if this condition is not transient and continues for at least some predetermined period of time, then the signal processor or signal processing module 102 (FIG. 4) may be configured to implement a suitable acoustic signal processing algorithm that may indicate the collapse of the central air-core. The scope of the invention is not intended to be limited to any particular transient time, or any particular predetermined period of time.

It is noted that a person skilled in the art would appreciate and understand that acoustic signal processing algorithms for processing acoustic signaling from probes like element 210 having acoustic isolation members like 220a, 220b, 220c are known in the art, and the scope of the invention is not intended to be limited to any particular type or kind thereof either now known or later developed in the future. Moreover, a person skilled in the art would be able to implement the present invention consistent with that disclosed herein without undue experimentation based upon the same. By way of example, a person skilled in the art would appreciate and understanding without undue experimentation, especially after reading the instant patent application together with that known in the art, e.g., how to implement suitable acoustic signaling processing functionality in the signal processor or signal processing module like element 102 (FIG. 4) to receive such signaling containing such information from such a CYCLONEtrac™ PST probe, as well as how to adapt such a CYCLONEtrac™ PST probe to implement suitable signaling functionality to provide such sensed acoustic signaling containing such information to the signal processor or signal processing module like element 102.

Based upon the aforementioned, and by way of example, the following techniques may be implemented:

One technique may be to use strain gauges to detect the bending moment on the probe/sensor like element 210 produced by the fluid impact caused by particles like element P, e.g., consistent with that set forth herein.

Another technique may be using an acoustic probe/sensor like element 210 to look at the frequency spectrum, e.g., that will be significantly different depending on the presence or absence of the central air-core 208, e.g., consistent with that set forth herein.

An additional technique may be to use a probe/sensor like element 210 with one or more separate detection areas like elements 214a, 214b, 214c located along the axis of the probe like element 210. These one or more separate detection areas like elements 214a, 214b, 214c will experience significantly different acoustic signals depending on the presence or absence of the central air core 208, i.e. whether or not there is fluid or slurry impacting these separate detection areas like elements 214a, 214b, 214c. These one or more separate detection areas like elements 214a, 214b, 214c can be formed by creating acoustically isolated cylindrical areas along the cylindrical axis of the probe/sensor like element 210 by using an acoustically isolating material like elements 220a, 220b, 220c such as rubber between metallic detection areas like elements 214a, 214b, 214c. Both the metal and isolating material should have very good abrasion resistance so they can survive the flow of abrasive particles in the fluid. By way of example, the one or more separate detection areas like elements 214a, 214b, 214c may be coupled to individual transducers (not shown), e.g., via separate wave guides that are designed or integrated into the probe/sensor like element 210. By way of further example, such wave guides could be concentric cylinders with acoustic isolation between them.

The Signal Processor or Processor Module 102

The functionality of the signal processor or processor module 102 may be implemented using hardware, software, firmware, or a combination thereof. In a typical software implementation, the processor module may include one or more microprocessor-based architectures having a microprocessor, a random access memory (RAM), a read only memory (ROM), input/output devices and control, data and address buses connecting the same, e.g., consistent with that shown in FIG. 4, e.g., see element 104. A person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the apparatus 100 may also include, e.g., other signal processor circuits or components 104 that do not form part of the underlying invention, e.g., including input/output modules, one or more memory modules, data, address and control busing architecture, etc. In operation, the at least one signal processor or signal processing module 102 may cooperation and exchange suitable data, address and control signaling with the other signal processor circuits or components 104 in order to implement the signal processing functionality according to the present invention. By way of example, the signaling $S_{in}$ may be received by such an input module, provided along such a data bus and stored in such a memory module for later processing, e.g., by the at least one signal processor or signal processing module 102. After such later processing, processed signaling resulting from any such determination may be stored in such a memory module, provided from such a memory module along such a data bus to such an output module, then provided from such an output module as the corresponding signaling $S_{out}$, e.g., by the at least one signal processor or signal processing module 102.

Figure 6:
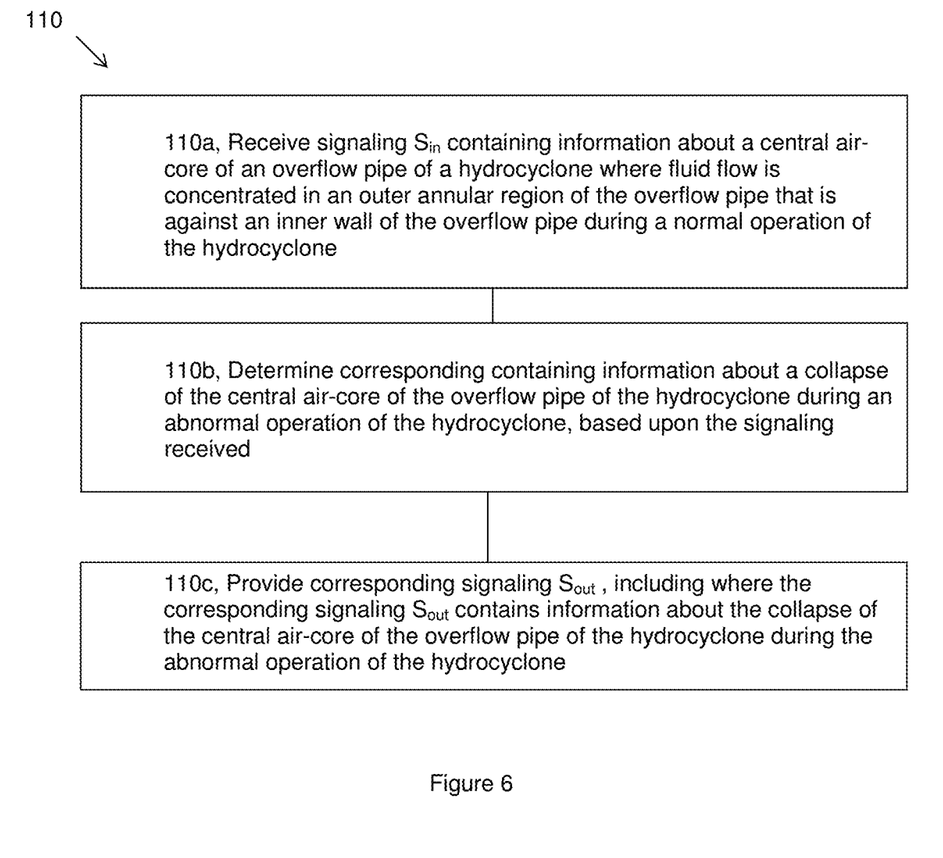
FIG. 6 shows a block diagram of a flowchart for a method, according to some embodiments of the present invention.

FIG. 6

FIG. 6 shows a flowchart generally indicated as 110 for a method having steps 110a, 110b and 110c for implementing the signal processing functionality, e.g., with at least one signal processor or signal processing module like element 102 in FIG. 4, according to some embodiments of the present invention.

The method 100 may include a step 110a for responding with at least one signal processor or signal processing module to signaling containing information about a central air-core of an overflow pipe of a hydrocyclone where fluid flow is concentrated in an outer annular region of the overflow pipe that is against an inner wall of the overflow pipe during a normal operation of the hydrocyclone; and a step 110b for determining with the at least one signal processor or signal processing module corresponding signaling containing information about a collapse of the central air-core of the overflow pipe of the hydrocyclone during an abnormal operation of the hydrocyclone, based upon the signaling received. The method 100 may also include a step 110c for providing the corresponding signaling, including where the corresponding signaling provided contains information about the collapse of the central air-core of the overflow pipe of the hydrocyclone during the abnormal operation of the hydrocyclone.

The method may also include one or more steps for implementing other features of the present invention set forth herein, including steps for making the various determinations associated with the statistical algorithm or technique, e.g., consistent with that set forth herein.

The Apex Diameter and Operation of Hydrocyclone

Based on that known in the prior art, and as a person skilled in the art would appreciate, if the apex diameter of a cyclone is too large, then there is an increment in the ratio of underflow flow rate to overflow flow rate. Also, the percentage (%) of solids of the underflow decreases and the excess of water carries unclassified fine particles to the underflow affecting the performance of the hydrocyclone.

When the apex diameter of the hydrocyclones is too large, the overflow flow rate decreases, this flow rate decrement affects the flow path of slurry in the overflow pipe and slurry is not hitting the PST probe causing fluctuation in the PST readings.

In view of this, PST measurement readings are able to provide an indication of cyclone wear, e.g., consistent with that set forth herein.

The Determination of a Damaged/Worn Cyclone Part

By way of example, the determination of a damaged or worn cyclone part may take the form of one or more of the following techniques:

For example, the corresponding signaling provided from the signal processor or processing module 102 may contain an indication about the status of the apex of the cyclone. The indication may take the form of an alarm signal alerting the plant manager about the status of the part of the cyclone. The alarm signal may be an audio signal, or a visual signal (e.g., one or more blinking lights), or some combination thereof.

CYCLONEtrac™ PST Probe

As one skilled in the art would appreciate, the CYCLONEtrac™ Particle Size Tracking (PST) Probe was developed by the assignee of the present invention and is known in the art. By way of example, the reader is referred to the aforementioned patent application Ser. No. PCT/US14/52628 for a more detailed discussion of the same, e.g., including that set forth in relation to FIG. 3C of that application.

The Classification Stage 10

By way of example, the present invention as it relates to the classification stage 10 is described in relation to the mineral extraction processing system shown, e.g., in FIGS. 1A and 1B, which takes the form of a copper concentrator, although the scope of the invention is not intended to be limited to any particular type or kind of mineral process or mineral extraction processing system either now known or later developed in the future.

The classification stage 10 may also include one or more elements, devices, apparatus or equipment that are known in the art, do not form part of the underlying invention, and are not disclosed herein or described in detail for that reason.

The scope of the invention re classification stage and/or hydrocyclone applications is not intended to be limited to the type or kind of mineral being processed, or the type of mineral process, either now known or later developed in the future. By way of example, the scope of the invention is intended to include hydrocyclone applications include Molybdenum, Lead, Zinc, Iron, Gold, Silver, Nickel, Fluorite, Tantalum, Tungsten, Tin, Lithium, Coal, as well as, e.g. diamonds, etc.

FIG. 3: The Cyclone or Hydrocyclone 20, 30

The cyclone or hydrocyclone, e.g., like elements 20, 30 in FIG. 3, are known in the art, and the scope of the invention is not intended to be limited to any particular type or kind thereof either now known or later developed in the future. The scope of the invention is intended to include implementing the present invention in relation to cyclone or hydrocyclone, e.g., like elements 20, 30, that are now known, as well as those later developed in the future.

Detection of Fluid Flow Rate

According to some embodiments of the present invention, detection of a fluid flow rate may also be accomplished, e.g. by detecting a change in the magnitude of a force and/or moment on the probe/sensor like element 210, e.g., consistent with that set forth herein. Detection of a decrease in fluid force can be useful because as the underflow discharge (apex) of the hydrocyclone wears, the amount of fluid flow through the apex increases and the fluid flow through the overflow decreases, assuming the fluid input pressure is the same. Thus detection of lower fluid flow through the overflow could indicate wear of the apex.

Applications Re Other Industrial Processes

By way of example, the present invention is described in relation to, and part of, a mineral extraction processing system for extracting minerals from ore. However, the scope of the invention is intended to include other types or kinds of industrial processes either now known or later developed in the future, including any mineral process, such as those related to processing substances or compounds that result from inorganic processes of nature and/or that are mined from the ground, as well as including either other extraction processing systems or other industrial processes, where the sorting, or classification, of product by size is critical to overall industrial process performance.

Hydrocyclone Performance Monitoring Products and Patents

By way of example, the assignee of the instant patent application has developed hydrocyclone performance monitoring products, which are disclosed in one or more of the following granted U.S. Pat. Nos. 6,354,147; 6,435,030; 6,587,798; 6,601,458; 6,609,069; 6,691,584; 6,732,575; 6,813,962; 6,862,920; 6,889,562; 6,988,411; 7,032,432; 7,058,549; 7,062,976; 7,086,278; 7,110,893; 7,121,152; 7,127,360; 7,134,320; 7,139,667; 7,146,864; 7,150,202; 7,152,003; 7,152,460; 7,165,464; 7,275,421; 7,359,803; 7,363,800; 7,367,240; 7,343,820; 7,437,946; 7,529,966; and 7,657,392, which are all incorporated by reference in their entirety. The disclosure herein related to the present invention is intended to be interpreted consistent with the family of technologies disclosed in all the issued patents incorporated by reference herein.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
    a signal processor configured to:
       receive signaling containing information about a central air-core of an overflow pipe of a hydrocyclone where fluid flow is concentrated in an outer annular region of the overflow pipe that is against an inner wall of the overflow pipe during a normal operation of the hydrocyclone, the signaling being sensed by a probe that is inserted radially through the inner wall of the overflow pipe of the hydrocyclone so as to contact the fluid flow and central air-core, and that has one or more separate detection areas located along an axis of the probe that experience different acoustic signals depending on the presence or absence of the central air core and formed by creating acoustically isolated areas along the axis of the probe by using an acoustically isolating material, the signaling containing information about different acoustic signals experienced by the one or more separate detection areas depending on the presence or absence of the central air core; and
       determine corresponding signaling containing information about a collapse of the central air-core of the overflow pipe of the hydrocyclone during an abnormal operation of the hydrocyclone, based upon the signaling received.

2. Apparatus according to claim 1, wherein the signal processor is configured to provide the corresponding signaling, including where the corresponding signaling contains information about the collapse of the central air-core of the overflow pipe of the hydrocyclone during the abnormal operation of the hydrocyclone.

3. Apparatus according to claim 1, wherein the probe includes multiple sensing areas for sensing a presence or an absence of the fluid flow and central air-core.

4. Apparatus according to claim 3, wherein the signal processor is configured to determine a fluid flow rate of the fluid flow by detecting a change in the magnitude of a force, or a moment on the probe, or both.

5. Apparatus according to claim 4, wherein the corresponding signaling contains information about the fluid flow rate determined.

6. Apparatus according to claim 1, wherein the signaling contains information about measurements by strain gauges that detect a bending moment on the probe produced by the fluid flow impact.

7. Apparatus according to claim 1, wherein the signaling contains information about an acoustic frequency spectrum that will be different depending on the presence or absence of the central air-core.

8. Apparatus according to claim 7, wherein the probe comprises, or takes the form of, an acoustic sensor that responds to the fluid flow and provides the signaling containing information about the acoustic frequency spectrum.

9. Apparatus according to claim 1, wherein the signaling contains information about whether or not there is fluid or slurry impacting the one or more separate detection areas.

10. Apparatus according to claim 9, wherein the acoustically isolating material includes rubber between metallic detection areas.

11. Apparatus according to claim 1, wherein the one or more separate detection areas include both metal material and isolating material.

12. Apparatus according to claim 1, wherein the one or more separate detection areas are coupled to individual transducers via separate wave guides that are configured or designed into the probe, including where the separate wave guides are concentric cylinders with acoustic isolation arranged inbetween.

13. Apparatus according to claim 1, wherein the signal processor is configured to determine a fluid flow rate of the fluid flow by detecting a change in the magnitude of a force, or a moment on the probe, or both.

14. Apparatus according to claim 13, wherein the corresponding signaling contains information about the fluid flow rate determined.

15. A method comprising:
    receiving in a signal processor signaling containing information about a central air-core of an overflow pipe of a hydrocyclone where fluid flow is concentrated in an outer annular region of the overflow pipe that is against an inner wall of the overflow pipe during a normal operation of the hydrocyclone, the signaling being sensed by a probe inserted radially through the inner wall of the overflow pipe of the hydrocyclone so as to contact the fluid flow and central air-core; and
    determining in the signal processor or signal processing module corresponding signaling containing information about a collapse of the central air-core of the overflow pipe of the hydrocyclone during an abnormal operation of the hydrocyclone, based upon the signaling received;
    the signaling containing information about one or more separate detection areas located along an axis of the probe that experience different acoustic signals depending on the presence or absence of the central air core; and
    the one or more separate detection areas being formed by creating acoustically isolated cylindrical areas along a cylindrical axis of the probe by using an acoustically isolating material.

16. A method according to claim 15, wherein the method comprises providing with the signal processor the corresponding signaling, including where the corresponding signaling contains information about the collapse of the central air-core of the overflow pipe of the hydrocyclone during the abnormal operation of the hydrocyclone.

17. A method according to claim 15, wherein the method comprises sensing a presence or an absence of the fluid flow and central air-core with multiple sensing areas of the probe.

18. A method according to claim 15, wherein the signaling contains information about measurements by strain gauges that detect a bending moment on the probe produced by the fluid flow impact.

19. A method according to claim 15, wherein the signaling contains information about an acoustic frequency spectrum that will be different depending on the presence or absence of the central air-core.

20. A method according to claim 19, wherein the method comprises using for the probe an acoustic sensor that responds to the fluid flow and provides the signaling containing information about the acoustic frequency spectrum.

21. A method according to claim 15, wherein the signaling contains information about whether or not there is fluid or slurry impacting the one or more separate detection areas.

22. A method according to claim 21, wherein the acoustically isolating material includes rubber between metallic detection areas.

23. A method according to claim 15, wherein the one or more separate detection areas include both metal material and isolating material.

24. A method according to claim 15, wherein the one or more separate detection areas are coupled to individual transducers via separate wave guides that are configured or designed into the probe, including where the separate wave guides are concentric cylinders with acoustic isolation arranged inbetween.

25. A method according to claim 15, wherein the method comprises configuring the signal processor and the probe to exchange the signaling.

26. Apparatus, including a non-transitory computer-readable storage medium having computer-executable components, configured to perform the steps of the method recited in claim 15.

27. A mineral extraction processing system comprising:
a hydrocyclone having an overflow pipe with an inner wall, and being configured to process a fluid flow concentrated in an outer annular region of the overflow pipe that is against the inner wall of the overflow pipe during a normal operation of the hydrocyclone;
a probe having separate detection areas located along a cylindrical axis of the probe that experience different acoustic signals depending on a presence or absence of a central air core and formed by acoustically isolated cylindrical areas separated by acoustically isolating material, configured to insert radially through the inner wall of the overflow pipe of the hydrocyclone so as to contact the fluid flow and a central air-core, and also configured to respond to the fluid flow, and provide signaling containing information about the central air-core of the overflow pipe of the hydrocyclone and also about the different acoustic signals experienced by the separate detection areas depending on the presence or absence of the central air core; and
a signal processor configured to:
receive the signaling, and
provide corresponding signaling containing information about a collapse of the central air-core of the overflow pipe of the hydrocyclone during an abnormal operation of the hydrocyclone, based upon the signaling received.

28. A mineral extraction processing system according to claim 27, wherein the probe includes multiple sensing areas for sensing a presence or an absence of the fluid flow and the central air-core.

* * * * *